UNITED STATES PATENT OFFICE.

CHARLES J. McDERMOTT, OF SANDY HOOK, CONNECTICUT, ASSIGNOR TO NEW YORK BELTING AND PACKING COMPANY, OF NEW YORK, N. Y.

RECOVERING RUBBER FROM RUBBER WASTE.

SPECIFICATION forming part of Letters Patent No. 311,135, dated January 20, 1885.

Application filed January 11, 1882. (No specimens.)

*To all whom it may concern:*

Be it known that I, CHARLES JOSEPH MCDERMOTT, of Sandy Hook, in the county of Fairfield and State of Connecticut, have invented new and useful Improvements in Recovering Rubber from Rubber Waste, which improvements are fully set forth in the following specification.

This invention has for its object to effect the separation of the fibrous matter from vulcanized or unvulcanized rubber or rubber compounds applied to cloth and other textile materials and combined therewith, and particularly from old or waste vulcanized rubber—such, for example, as old boots and shoes, overcoats, hose, belting, and the like, and from the scrap made in manufacture of various articles and consisting, generally, of cloth covered with unvulcanized rubber—and to recover the rubber for reuse.

Heretofore it has been customary to grind the rubber and fiber together and use the resulting material for admixture with fresh rubber, but such material is capable of very limited use. In order to weaken the fiber to enable it more easily to be ground, it has been treated with very dilute sulphuric acid; but in this process the fiber is not removed, nor is it brought into condition for removal by washing. It may be observed, also, that vulcanized rubber has been treated with alkalies and with acids, in order to remove the sulphur or sulphur compounds, and to clean it of dirt and similar impurities. It has also been subjected to the action of steam and hot water, and of benzine or other solvent, to soften the same. A process of eliminating fiber has also been proposed which consists in immersing from a day to a week fibrous rubber clippings (the fiber being either woolen or cotton) in sulphuric acid of from 53° to 58° Baumé at a temperature of from 60° to 80° centigrade, so as to eat up or destroy the integrity of the fiber without destroying the rubber, and in washing or otherwise removing the disintegrated fiber, leaving the rubber in a workable condition.

The present invention consists in the special steps of the process, as hereinafter indicated.

When the fibrous material in the waste or scrap is of wool, it can be disintegrated by boiling the waste or scrap from one to one and one-half hour in alkali—say twenty to twenty-five pounds waste or scrap to five to seven pounds caustic potash or soda dissolved in two gallons of water, or thereabout. The fiber can then be removed by washing. Cotton fiber can be removed by boiling in oil of vitriol (sulphuric acid) or in muriatic (hydrochloric) acid; or the waste or scrap may be subjected to the acid in a cold state, only in that case the time must be considerably extended. With oil of vitriol, for example, ten pounds of waste may be boiled for one and a quarter hour in five pounds of oil of vitriol or in similar proportions for larger quantities. With cold acid the scrap or waste may be allowed to soak until the fiber is sufficiently eaten up.

A preliminary softening by steaming, boiling in water, or in an alkaline solution, treating with benzine, turpentine, and the like, or in other known or suitable way has been employed by me, and in some cases is advantageous. The boiling can be done by direct fire, but preferably by steam heat applied by coils or a jacket, or by direct admission into the mixture of scrap or waste and chemical agents.

The following is a description of what are deemed to be the best practical modes of carrying the invention into effect, and it will enable those skilled in the art to which it appertains to use the invention.

For treating all kinds of waste of unvulcanized rubber—such as overcoating, hose, belting, and all kinds of waste containing cotton fiber—the following mixture is used: Forty parts sulphuric acid reduced to a density of 12° Baumé, two parts bichromate of potash, four parts muriatic acid, two parts black oxide of manganese, three parts salt. These chemicals are mixed without the sulphuric acid, except the oxide of manganese, which is put in the sulphuric acid. The others, when mixed, are used as indicated below. The sulphuric acid and manganese are put in the bottom of a tub, such as hereinafter explained, and the rubber waste is put in on top of these, and then the other chemicals are put in the tub on top of the rubber waste. The steam is then turned on from a boiler carrying from eighty to one hundred pounds of steam, and the mass is allowed to boil for thirty minutes, when the lids are removed from the top of the tub, and the whole mass is then stirred up with a long wooden stick. The lids are again placed on and the stock boiled for fifteen minutes more, when it is finished, so far as the chemicals are concerned. The stock is now placed in a washing-machine, and the chemicals, &c., are washed out of it with cold water. The cold water is run off and the washing-machine filled with boiling water, and then five pounds of pearlash to five hundred pounds of stock put in the machine and allowed to remain ten minutes, when the water is again discharged. The stock, now all in small pieces, after being washed, is placed in a pair of rollers with a stream of water continually playing on it. The stock, after passing through these rollers, is stuck together in a thin sheet. It is passed through the rollers three or four times, to make the sheet more compact, when it is hung up in a drying-room to dry, after which it is ready for use.

For recovering the rubber from old boots and shoes, vulcanized, thirty parts sulphuric acid, density 10° Baumé, three parts sal-ammoniac, five parts oxide manganese, eight parts muriatic acid, and three parts salt are used. The sulphuric acid and sal-ammoniac are put in the bottom of the tub. There is then enough stock put in to cover that solution. The oxide of manganese is then spread over the top of the stock. The tub is then filled with more stock, and the salt spread over the top. The tub is now fully filled with stock and muriatic acid is poured on. The tub is then covered with lids and steam turned on. The stock is kept boiling for forty-five minutes, and then the chemical process is finished so far as the fiber is concerned.

For hose and belting, vulcanized, thirty-seven parts sulphuric acid, density 12° Baumé, three parts carbolic acid, seven parts lime are used. These chemicals are mixed together and placed in the bottom of the tub, the stock is put in on top, steam turned on, and the mass allowed to boil fifty minutes, when it is finished so far as the fiber and chemicals are concerned.

For shoddy-stock containing unvulcanized rubber—such as boots and shoes—twenty-five parts sulphuric acid, density 32° Baumé, five parts manganese, ten parts pearlash, eight parts caustic potash, three parts salt are used. The sulphuric acid and salt are placed in the bottom of the tub, the stock placed on top, and then the pearlash and caustic potash, in solution, are poured in over the stock. The steam is then turned on fifty minutes, when the stock is washed and put through the same process as with overcoating, &c., in the washing-machine, and finished in the same for use.

The dimensions of the tub in which the rubber is recovered with the chemicals, and the pipes which it contains for the introduction of steam, are or may be as follows: The tub is seven feet long at the bottom, and thirty inches wide by forty inches deep, and flares four inches on each side and end, at the top, which is covered with lids made up of four sections. The two middle sections have openings about ten by five inches, making, when placed in position on the tub, a central opening ten inches square. In each of the end sections of the lid is a round hole about one and one-half inch in diameter, through which pass the steam-pipes. These pipes are fifty inches long, and at the bottom of the tub each enters a three-pronged pipe that runs thirty inches lengthwise of the tub. The three prongs have eight holes three-sixteenths of an inch in diameter. In the two outside prongs three holes are bored at an angle of forty-five degrees from the center of the tub. The middle prong rests in the center of the tub, and the holes in it are perpendicular. The lining of the tub, which is of lead, extends over the edge and three inches on the outside, and is there fastened. The introduction of steam to the tub is or may be by rubber hose extending from the main pipe to the pipe that enters the tub.

Having now fully described the invention and the manner of carrying the same into effect, I would observe that the present invention differs from the treatment of fibrous rubber waste with a solution of, say, 1° Baumé, so as to weaken the fiber and enable it to be ground up with the rubber, and from the soaking of fibrous rubber clippings in strong sulphuric acid of 53° to 58° Baumé, (see French Letters Patent to Faure, dated April 3, 1871,) in that neither of them do what I accomplish. The first, or Hayward's process, does not eliminate the fiber. In the second, or Faure process, the great strength of acid is liable to burn or eat up the rubber, and, besides, renders the washing and neutralization difficult. Faure's process requires the soaking of the scrap for from a day to a week, while my process requires only a small fraction of a day. In my invention I employ dilute acid, say sulphuric acid of 12° Baumé, more or less, (sometimes as high as 32° Baumé,) according to the toughness of the fiber, taking care that the acid shall have sufficient strength to attack the fiber energetically, but not be of excessive strength to affect the rubber injuriously, or to render washing and neutralization difficult or expensive.

The effect of the acid I consider to be principally to disintegrate the fiber and separate it from the rubber, since, in the subsequent washing operation, a considerable quantity of mud is washed away which contains, I suppose, the disintegrated fiber. I would observe, also, that certain matters herein described are claimed in my Patent No. 262,079, dated August 1, 1882. Said matters are, however, not necessarily involved in the present invention, they being in the nature of improvements upon this invention. For example, it is not necessary, although advantageous, to inject steam in order to boil the waste in the acid, because, as I have already hereinbefore stated, the boiling can be done by a steam jacket or coil, or by fire-heat; neither is it necessary to use bichromate of potash, although its use is sometimes advantageous, since the fiber can be eliminated by dilute acid without it, as already shown.

What I do claim, and desire to secure by Letters Patent, is—

1. The method of eliminating fiber from fibrous rubber waste or scrap, vulcanized or unvulcanized, by treating the scrap or waste in dilute acid—say sulphuric acid of 12° Baumé, more or less—and afterward washing the rubber, substantially as described.

2. The method of eliminating fiber from fibrous rubber waste or scrap, vulcanized or unvulcanized, by boiling the scrap or waste in dilute acid—say sulphuric acid of 12° Baumé, more or less—at a high temperature, and afterward washing the rubber, substantially as described.

3. In eliminating fiber from fibrous rubber waste or scrap, the improvement consisting in treating the scrap or waste with a mixture of sulphuric and muriatic acids, substantially as described.

4. In eliminating fiber from fibrous-rubber waste, the improvement consisting in treating the same with an acid solution containing materials adapted to generate nascent chlorine—such as the mixture of sulphuric acid, salt, and manganese described.

In testimony whereof I have signed this specification in the presence of two subscribing witnesses.

CHAS. J. McDERMOTT.

Witnesses:
A. POLLOK,
PHILIP MAURO.